(12) United States Patent
Herrero

(10) Patent No.: US 12,554,949 B2
(45) Date of Patent: Feb. 17, 2026

(54) OBJECT HIERARCHY TO SUPPORT DEVICE CONFIGURATION IN PHYSICAL ACCESS CONTROL SYSTEMS

(71) Applicant: Johnson Controls Tyco IP Holdings LLP, Milwaukee, WI (US)

(72) Inventor: Rolando Herrero, Amherst, NH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 231 days.

(21) Appl. No.: 18/458,584

(22) Filed: Aug. 30, 2023

(65) Prior Publication Data

US 2025/0077806 A1 Mar. 6, 2025

(51) Int. Cl.
*G06K 7/10* (2006.01)

(52) U.S. Cl.
CPC .................. *G06K 7/10227* (2013.01)

(58) Field of Classification Search
None
See application file for complete search history.

(56) References Cited

U.S. PATENT DOCUMENTS

| | | | | |
|---|---|---|---|---|
| 7,331,049 B1* | 2/2008 | Jin | ................ | G06Q 10/107 709/201 |
| 8,098,160 B2* | 1/2012 | Howarth | ............ | G08B 13/2417 340/657 |
| 9,699,205 B2* | 7/2017 | Muddu | .................... | H04L 41/22 |
| 9,867,036 B2* | 1/2018 | Gopalan | ................ | H04W 8/18 |
| 11,507,568 B2* | 11/2022 | Michaelis | ............... | H04L 67/12 |
| 2010/0153434 A1* | 6/2010 | Erickson | ........... | G06Q 30/0269 707/769 |
| 2010/0162268 A1* | 6/2010 | Thomas | .................. | G06F 9/542 719/318 |
| 2011/0102140 A1* | 5/2011 | McGeachie | ........... | G06F 21/335 340/5.81 |
| 2011/0285502 A1* | 11/2011 | Steinmetz | ............ | G06K 7/0008 340/10.5 |
| 2011/0320550 A1* | 12/2011 | Lawson | ............... | H04L 51/214 709/206 |
| 2017/0214672 A1* | 7/2017 | Alhalabi | ................. | H04L 67/10 |

(Continued)

OTHER PUBLICATIONS

"MQTT Version 3.1.1," OASIS Committee Specification, Oct. 29, 2014, pp. 1-76.

(Continued)

*Primary Examiner* — Muhammad Adnan
(74) *Attorney, Agent, or Firm* — ArentFox Schiff LLP

(57) ABSTRACT

Example implementations include a method, apparatus, and computer-readable medium for configuring a device in a physical security system via an open architecture. The device receives a command from an application via a publish-and-subscribe broker. The command includes: a type field indicating the command, a source field indicating the application, a timestamp, and a payload including a list of objects, each object including one or more parameters defined by a field name, a datatype, one or more possible values, and a mandatory status. The device transmits an event message to the application via the publish-and-subscribe broker, the event message includes a type field identifying the event message, a source field identifying the device, a timestamp, and a payload including a type field identifying a type of event.

20 Claims, 6 Drawing Sheets

(56) References Cited

U.S. PATENT DOCUMENTS

| | | | |
|---|---|---|---|
| 2018/0300678 A1* | 10/2018 | Drako | G07C 9/00571 |
| 2019/0095510 A1* | 3/2019 | Cruise | G06F 16/24568 |
| 2020/0074338 A1* | 3/2020 | Florentino | G06N 7/01 |
| 2020/0145820 A1* | 5/2020 | Hoyer | G06N 20/00 |
| 2021/0004874 A1* | 1/2021 | Bur | G06Q 30/0269 |
| 2024/0061729 A1* | 2/2024 | Xiong | G06F 9/542 |
| 2025/0080614 A1* | 3/2025 | Herrero | H04L 67/55 |
| 2025/0109946 A1* | 4/2025 | Karuppiah | H04L 67/125 |

OTHER PUBLICATIONS

Bray, T., "RFC8259: The JavaScript Object Notation (JSON) Data Interchange Format," IETF, Dec. 2017, pp. 1-16.
Postel, J., "RFC793: Transmission Control Protocol," IETF, Sep. 1981, pp. 1-81.
Rescorla, E., "RFC8446: The Transport Layer Security (TLS) Protocol Version 1.3," IETF, Aug. 2018, pp. 1-160.
Extended European Search Report issued in corresponding European Application No. EP 24 19 7131 dated Jan. 31, 2025.

\* cited by examiner

OBJECT HIERARCHY TO SUPPORT DEVICE CONFIGURATION IN PHYSICAL ACCESS CONTROL SYSTEMS

FIELD

The present disclosure relates generally to an object hierarchy to support device to application configuration in physical access control systems.

BACKGROUND

Physical access control systems include various devices that control access to an area, typically within a premises such as a building. For example, an access control system may include gates, doors, and identification devices such as card readers, radio frequency identification (RFID) readers, or keypads. In some cases, a physical access control system is integrated with a security system including cameras, sensors, or alarms.

Configuration of a physical access control system is often labor intensive. In addition to labor of installing the hardware devices, labor is often needed to update a configuration, even if there are no physical changes to the system. For example, a change in schedules or uses for an area may require a reconfiguration of the physical access control system. Thus, there is a need to improve configuration in physical access control systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method including: receiving, at a device, a command from an application via a publish-and-subscribe broker, the command including: a type field indicating the command, a source field indicating the application, a timestamp, and a payload including a list of objects, each object including one or more parameters defined by a field name, a datatype, one or more possible values, and a mandatory status; and transmitting, from the device, an event message to the application via the publish-and-subscribe broker, the event message including: a type field identifying the event message, a source field identifying the device, a timestamp, and a payload including a type field identifying a type of event.

In some aspects, the techniques described herein relate to a configurable security device, including: one or more memories storing computer executable instructions; and one or more processors coupled to the one or more memories and, individually or in combination, configured to cause the device to: receive, at the device, a command from an application via a publish-and-subscribe broker, the command including: a type field indicating the command, a source field indicating the application, a timestamp, and a payload including a list of objects, each object including one or more parameters defined by a field name, a datatype, one or more possible values, and a mandatory status; and transmit, from the device, an event message to the application via the publish-and-subscribe broker, the event message including: a type field identifying the event message, a source field identifying the device, a timestamp, and a payload including a type field identifying a type of event.

In some aspects, the techniques described herein relate to a method including: transmitting a command from an application to a device via a publish-and-subscribe broker, the command including: a type field indicating the command, a source field indicating the application, a timestamp, and a payload including a list of objects, each object including one or more parameters defined by a field name, a datatype, one or more possible values, and a mandatory status; and receiving an event message from the device at the application via the publish-and-subscribe broker, the event message including: a type field identifying the event message, a source field identifying the device, a timestamp, and a payload including a type field identifying a type of event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

A premises for building automation with physical security systems may include multiple devices that can be controlled. Often a control panel can be associated with multiple other devices such as card readers and doors. Conventionally, each device has a proprietary control system for configuration and operation. This closed architecture may limit options for integration with other devices and development of applications for physical security systems.

In physical security systems, the multiple devices may interact in order to secure a location. For example, a door may be controlled by a card reader via a control panel. While some devices may include network communications hardware and be fully configurable, other devices may receive simple or proprietary signals to control operation. Adding full network capabilities to such devices may complicate configuration and increase costs.

In an aspect, the present disclosure provides a communication mechanism that supports an Open Architecture. The communication mechanism includes several protocols that enable applications to interact with physical access control systems in the context of building automation. Because this architecture is open, the protocol specifications are open and available to end users. Accordingly, an application may be developed by a third party to interact with devices in the physical access control system, while still providing security.

In an aspect, the Open Architecture may utilize hierarchical definitions of messages and objects. For example, a message may include fields that are common to all message types and a payload that is specific for a type of the message. Example message types include a command message and an event message. An object may be defined for each type of device. Some objects for devices may include references to other objects for other devices that are connected to the device. For example, a panel object may include a reference to a door object. Accordingly, the configuration of the panel may include configuration of the door. The Open Architecture is expandable to include different message types and different objects, both for physical devices, and for configuration information.

Turning now to the figures, example aspects are depicted with reference to one or more components described herein, where components in dashed lines may be optional.

Figure 1:
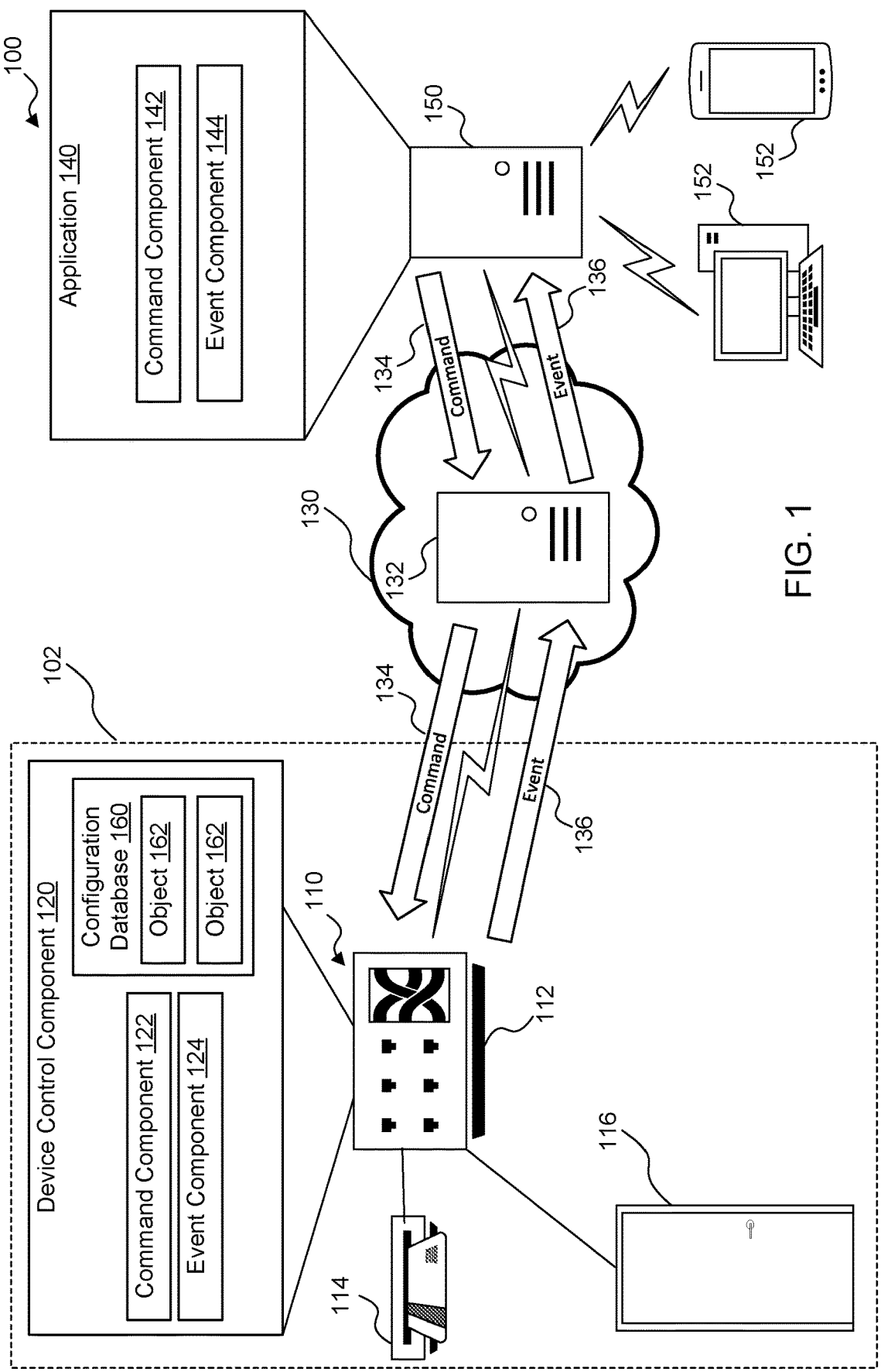
FIG. 1 is a schematic diagram of a physical access control environment for an application for device management, according to some aspects.

Referring to FIG. 1, in one non-limiting aspect, for example, a physical security environment 100 for a premises 102 includes devices 110 for physical security. The devices 110 may communicate with an application 140 via a network 130 including publish-and-subscribe broker 132. The application 140 and the devices 110 may establish application layer session to control configuration and operation of the devices 110.

A device 110 may include any device with a device control component 120 for controlling the device according to the mechanisms described herein. For example, a device 110 may include a control panel 112, a card reader 114, or a door 116. In some implementations, one device (e.g., control panel 112) may include the device control component 120 and control other components of the physical security environment via propriety protocols or direct electrical signals.

The application 140 may control the configuration and operation of the device 110 by configuring objects at the device 110. For example, the device configuration component 120 may include a configuration database 160 that stores objects 162. Each object 162 may include configuration information for the device 110. The device 110 is configured to operate according to the configuration database 160 and objects 162. For example, the control panel 112 may check a personnel object 162 to determine whether a person detected by the reader 114 is allowed to pass through the door 116. The control panel 112 may then control the door based on the result determined according to the configuration database 160.

The application 140 may send commands 134 to add, delete, modify, retrieve, or execute the objects 162. Accordingly, the application 140 may flexibly control the configuration and operation of the devices 110. The device 110 may transmit events 136 to report information about the device 110. For example, events 136 may include an object status event, an object information event, an activity report, or a heartbeat.

The publish-and-subscribe broker 132 may be a service executing on computer resources such as a server or cloud network 130. The publish-and-subscribe broker 132 may implement an event driven architecture (EDA). For instance, in some implementations, the publish-and-subscribe broker 132 implements a MQTT protocol. The publish-and-subscribe broker 132 receives messages associated with a topic and publishes the messages to any devices subscribed to the topic. In an implementation, each pair of device 110 and application 140 create uniquely named topics for carrying commands 134 and events 136.

The device control component 120 is configured to control operation of a device 110. The device control component 120 includes a command component 122 configured to receive, at a device 110, a command 134 from an application 140 via a publish-and-subscribe broker 132. The command includes: a type field indicating the command, a source field indicating the application, a timestamp, and a payload including a list of objects, each object including one or more parameters defined by a field, a type, one or more possible values, and a mandatory status. The device control component 120 includes an event component 124 configured to transmit, from the device 110, an event 136 to the application 140 via the publish-and-subscribe broker 132. The event 136 includes a type field identifying the event message, a source field identifying the device, a timestamp, and a payload including a type field identifying a type of event.

The application 140 is configured to configure one or more devices 110. The application 140 includes components corresponding to the components of the device control component 120. The application 140 includes a command component 142 configured to transmit, to a device 110, a command 134 via a publish-and-subscribe broker 132. The command includes: a type field indicating the command, a source field indicating the application, a timestamp, and a payload including a list of objects, each object including one or more parameters defined by a field, a type, one or more possible values, and a mandatory status. The application 140 includes an event component 144 configured to receive an event component 124 configured to transmit, from the device 110, an event 136 to the application 140 via the publish-and-subscribe broker 132. The event 136 includes a type field identifying the event message, a source field identifying the device, a timestamp, and a payload including a type field identifying a type of event.

The application 140 may be hosted on a computing device 150. The computing device 150 may be, for example, a server or generic computing resources in a datacenter of a cloud service. In some implementations, the computing device 150 may be provided by a same cloud service as the publish-and-subscribe broker 132. In some implementations, the application 140 may be accessed by user devices 152, which may include personal computers, laptop computers, tablets, mobile phones, etc. The application 140 may provide a user interface on the user devices 152.

The open architecture is agnostic of the physical, link and network layers but because the open architecture relies on a publish-and-subscribe protocol such as MQTT for session management, the open architecture utilizes transmission control protocol (TCP) transport. TCP transport, in turn, relies on transport layer security (TLS) for security. Although the security parameters are independent of both MQTT and the upper layers, in some implementations, the open architecture requires mandatory TLSv1.3 support configured with mutual authentication. The open architecture follows standard Public Key Infrastructure (PKI) mechanisms for certificate management.

The open architecture session management may be based on standard MQTT v3.1.1 functionality. MQTT is an Event Driven Architecture (EDA) protocol that relies on a broker that forwards messages back and forth between endpoints. Under EDA there are neither clients nor servers and the endpoints transmit and asynchronously receive messages. In the context of the open architecture, panels and applications are endpoints that rely on a broker or a network of brokers to forward the traffic. When compared to traditional Representational State Transfer (REST), the presence of a broker changes the topology of the network. Panels transmit application layer messages to an MQTT v3.1.1 broker that forwards the messages to the application. The application, in turn, sends messages to the broker and the broker forwards them to the panels. The broker has session layer visibility and does not decode the messages. The architecture supports access clusters that follow a traditional IoT topology where a cluster head talks to cluster members. The cluster head acts as a proxy that enables the interaction between the application and the members With the open architecture, the use of an MQTT v3.1.1 broker is sufficient to guarantee the exchange of messages. In order to support the command event paradigm, the open architecture relies on two MQTT topics per session. Each topic is associated with a traffic direction. In an implementation, the names of the topics follow a specified naming protocol. For example, the topic names may be [app]2[panel] and [panel]2[app] for traffic from the application to the panel and from the panel to the application respectively where [app] is the application identifier (i.e., host) and [panel] is the panel identifier (i.e., iSTAR30012b).

In some implementations, the open architecture forces endpoints to be configured with MQTT QoS level 2 to guarantee ordered and lossless delivery of messages. In addition, end-to-end TLS support guarantees full trust between MQTT endpoints.

Figure 2:
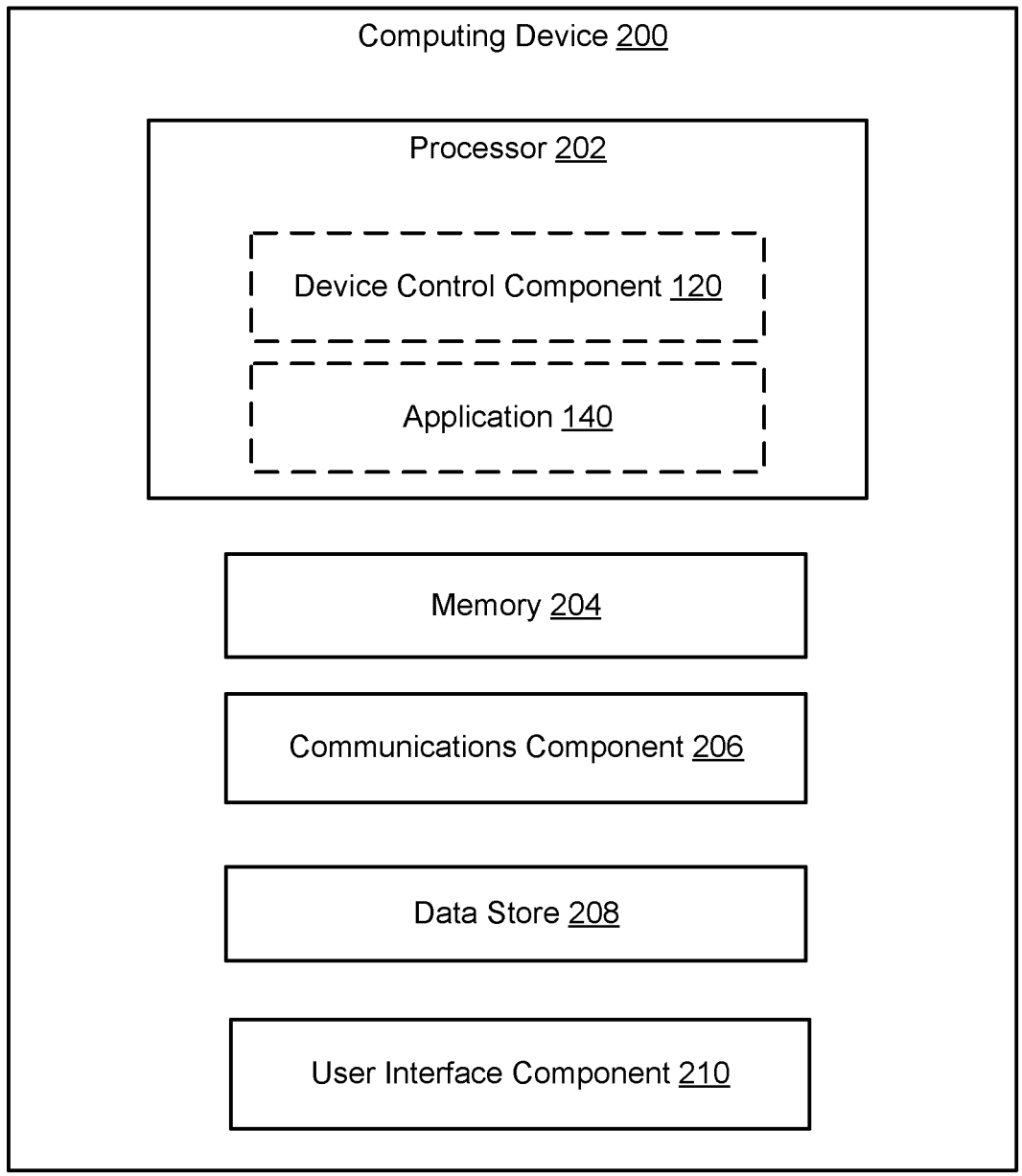
FIG. 2 is a block diagram of an example computing device which may implement all or a portion of any component or device in FIG. 1, according to some aspects.

FIG. 2 illustrates an example block diagram providing details of computing components in a computing device 200 that may implement all or a portion of one or more components in a control panel, a cloud system, a security/automation sensor or device, a user device (e.g., a smartphone, a tablet, a laptop computer, a desktop computer, etc.), a dedicated device, or any other component described above. For example, the computing device 200 may implement the device control component 120, the publish-and-subscribe broker 132, the application 140, the computing device 150 or a user device 152. The computing device 200 includes a processor 202 which may be configured to execute or implement software, hardware, and/or firmware modules that perform any functionality described above with reference to one or more components in a control panel, a cloud system, a security/automation sensor or device, a user device, a dedicated device, or any other component described above. For example, the processor 202 may be configured to execute a device management component 222 to provide device management functionality as described herein with reference to various aspects. For example, the processor 202 may be configured to execute software for the device control component 120 or the application 140. The software may be stored in the memory 204.

The processor 202 may be a micro-controller and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, flash drives, magnetic discs, optical discs, volatile memory, non-volatile memory (e.g., a non-transitory computer-readable medium storing instructions executable by the processor 202), and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc., utilizing hardware, software, and services. The communications component 206 may carry communications between components on the computing device 200, as well as between the computing device 200 and external devices, such as devices located across a communications network and/or devices serially or locally connected to the computing device 200. For example, the communications component 206 may include one or more buses, and may further include transmit chain components and receive chain components associated with a wireless or wired transmitter and receiver, respectively, operable for interfacing with external devices.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by the processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
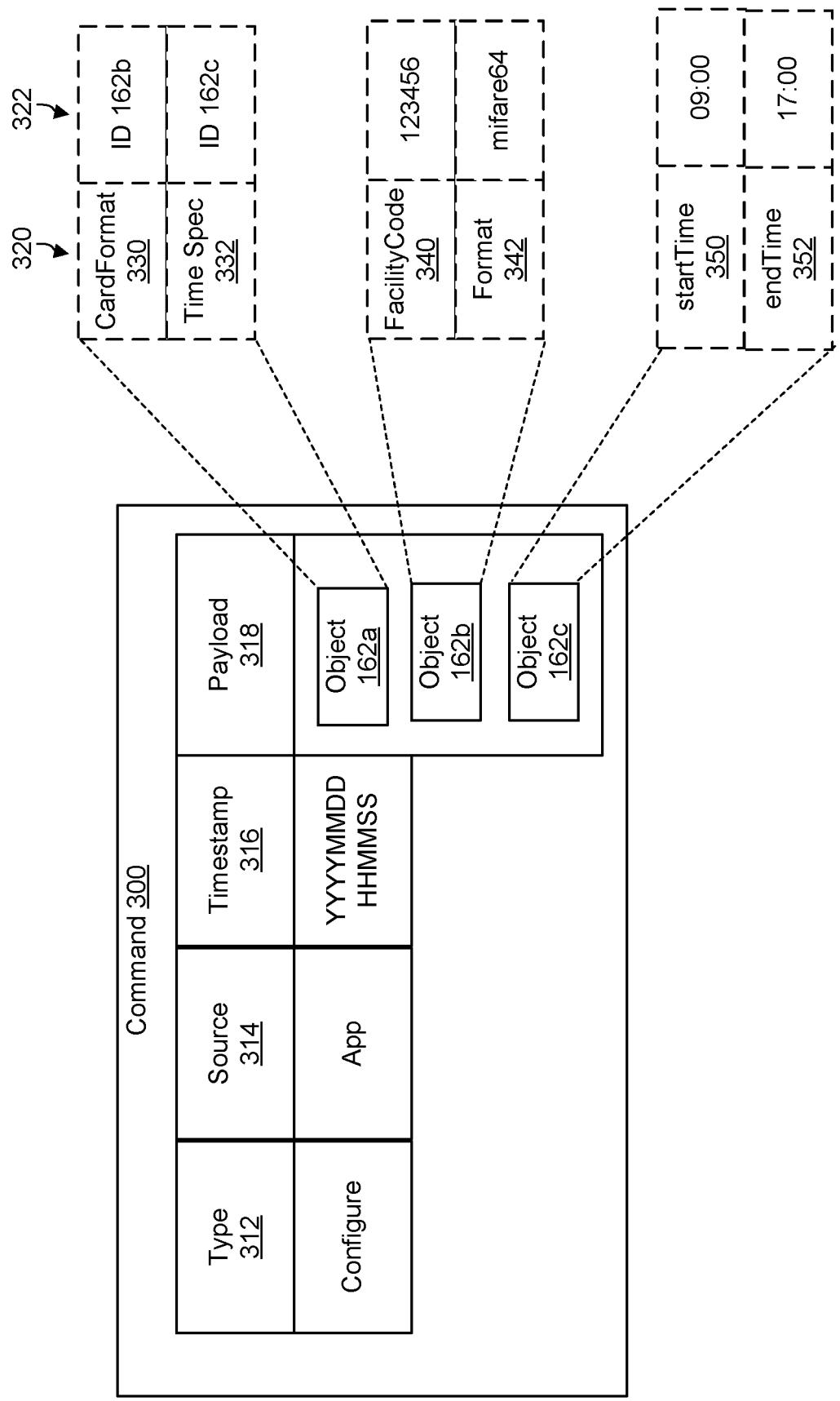
FIG. 3 is a diagram of a command message, according to some aspects.

FIG. 3 is a diagram of a command message 300, which may be an example message for transmitting a command 134. The command message 300 includes fields 310 including a type field 312, a source field 314, a timestamp 316, and a payload 318. The type field 312 is a mandatory field that includes a string datatype that defines the type of command. In the illustrated example, the type field 312 indicates a "configure" command. The source field 314 indicates a source of the command message 300, which may be the application 140. The timestamp 316 indicates a time of the message, which may be expressed in various known time formats. In some implementations, a Year, Month, Day, Hour, Minute, Second format is used to allow easy human readability of the timestamp. The payload 318 includes one or more objects 162.

The configure command enables to add, modify, get, delete or execute an object. The configure command includes an "objectList" array of objects to be configured. The parameters of the configure command are defined by a field name, a datatype, one or more possible values, and a mandatory status. Example parameters of a configure command are described in Table 1.

TABLE 1

| Field Name | Datatype | Possible Values | M | Details |
| --- | --- | --- | --- | --- |
| action | string | "add", "modify", "get", "delete", "execute" | x | indicates what action to perform on the object |
| ID | uint32 | | x | specifies a unique identifier |
| Method | string | | | if the action is "execute", method specifies the operation to perform |
| methodAction | string | "add", "delete" | | if the action is "execute", indicates what action to perform on the object |
| methodActivation | date | | | if the action is "execute", method activation |
| methodExpiration | date | | | if the action is "execute", method expiration |
| methodID | uint32 | | | if the action is "execute", ID associated with method |
| methodInterval | timeMs | | | if the action is "execute", interval associated with method |
| Name | string | | x | object name |
| request | string | "configuration", "status" | | otherwise indicated "configuration" and "status" are the default requests |
| requestList | array | | | if the action is "get", list of get request types |
| type | string | "acm", "afterHourList", "cardFormat", "clearance", "configuration", "door", "file", "group", "holiday", "input", "output", "personnel", "reader", "systemState", "timeSpec", "timeZone", "web" | x | specifies the object type |

In the configure command, the mandatory parameters include an action, an ID, a name, and a type. The action is one of add (a), modify (m), get (g), delete (d), or execute (e)). The ID and name are unique identifiers of an object. The type is a type of the object.

In an aspect, every entity associated with a device is considered an object. For example, a control panel is considered an object. This applies not only to physical entities like attached doors and readers but also to logical entities like the panel web interface or the panel configuration. The following Table 2 describes the different objects, the type of actions (a, m, g, d, and e) supported by each object as well as a short description of the object:

TABLE 2

| | Action | | | | | |
| --- | --- | --- | --- | --- | --- | --- |
| Object Type | a | m | g | d | e | Description |
| acm | x | x | x | x | | access control module |
| after hour list | | x | | | | after hour list |
| card format | x | x | x | x | | describes the supported card formats and facility codes |

TABLE 2-continued

| Object Type | Action a | Action m | Action g | Action d | Action e | Description |
|---|---|---|---|---|---|---|
| clearance | x | x | x | x |  | specifies a clearance that incorporates multiple doors and schedules |
| configuration | x |  | x | x | x | contains the panel configuration |
| door | x | x | x | x | x | identifies a door associated with readers, inputs and outputs |
| file | x |  | x | x | x | file transfer |
| group | x | x | x | x |  | groups multiple objects |
| heartbeat |  | x | x |  |  | heartbeat interval configuration |
| holiday | x | x | x | x |  | defines a special holiday schedule |
| input | x | x | x | x | x | configures an input |
| output | x | x | x | x | x | configures an output |
| personnel | x | x | x | x |  | identifies one personnel associated to a clearance, a card number and an activation as well as a deactivation time. |
| reader | x | x | x | x | x | configures an OSDP reader |
| system state |  |  | x |  |  | carries memory and other system information |
| time specification | x | x | x | x |  | identifies a schedule |
| time zone |  | x | x |  |  | configures the panel time zone |
| web interface |  | x | x |  |  | contains parameters of the web interface of the panel |

Each object 162 is separately defined to include one or more parameters defined by a field name, a datatype, one or more possible values, and a mandatory status. For example, the following Table 3 defines an access control module (ACM) object.

TABLE 3

| Field Name | Datatype | Possible Values | M | Details |
|---|---|---|---|---|
| acmType | string | "ipAcmv1", "ipAcmv2", "acm" |  | Type of ACM |
| address | string |  |  | layer 2 address (MAC address for Ethernet) |
| index | uint32 |  |  | module index |

As another example, the following Table 4 defines an After Hours List object:

TABLE 4

| Field Name | Datatype | Possible Values | M | Details |
|---|---|---|---|---|
| personnelID | uint32 |  | x | ID of the personnel that has been enabled for after hour access |
| reader | uint32 |  | x | ID of enabling reader |

As another example, the following Table 5 defines a Card Format object:

TABLE 5

| Field Name | Datatype | Possible Values | M | Details |
|---|---|---|---|---|
| facilityCode | uint32 |  |  | facility code |
| format | string | "mifare32", "mifare64", "hid35", "hid48", "hid37", "rs32", "rs40", "standard26" |  | Indicates format of ID card |
| reverseSwipeDuress | bool |  |  | Indicates whether swiping in opposite direction is configured |
| siteCode | uint32 |  |  | site code |

As another example, the following Table 6 defines a Clearance object:

TABLE 6

| Field Name | Datatype | Possible Values | M | Details |
|---|---|---|---|---|
| activation | date | | | Activation time for the clearance object |
| Door | uint32 | | | door ID |
| doorGroup | uint32 | | | door group ID |
| expiration | date | | | Expiration time for the clearance object |
| timeSpec | uint32 | | | time specification ID |

As another example, the following Table 7 defines a Configuration object. The configuration object can take no parameters and it is used to trigger configuration uploads from the panel to the application. Additionally it can be used to delete the current system configuration.

TABLE 7

| Field Name | Datatype | Possible Values | M | Details |
|---|---|---|---|---|
| method | string | "backup" | | backups configuration |

As another example, the following Table 8 defines a Door object:

TABLE 8

| Field Name | Datatype | Possible Values | M | Details |
|---|---|---|---|---|
| altShuntTime | uint32 | time in seconds (1-999) | | extended time to shunt door after it opens for ADA access |
| continuousActive | bool | | | door accepts cards continuously |
| delayRelock | uint32 | time in seconds (1-999) | | time to wait before door relocks after opening |
| doorCloseDebounceTime | uint32 | time in seconds (1-999) | | time to debounce closing door |
| doorOpenGraceTime | uint32 | time in seconds (1-999) | | time to debounce opening door |
| doorUnlockGraceTime | uint32 | time in seconds (1-999) | | time in which door is allowed to be opened after the unlock time |
| inboundReader | uint32 | | | inbound reader ID |
| latchRelay | uint32 | | | latch relay output ID |
| Method | string | "lock", "unlock", "momentaryUnlock", "secure" | | Method performed by Door |
| methodAction | string | "add", "delete" | | |
| methodActivation | date | | | |
| methodExpiration | date | | | |
| methodID | uint32 | | | |
| methodInterval | timeMs | | | |
| nonalarmToHost | bool | | | report non-alarm input states |
| outboundReader | uint32 | | | outbound reader ID |
| shuntDoorOnRTE | bool | | | shunt the door if RTE is active |
| shuntExpWarningTIme | uint32 | time in seconds (1-999) | | time to fire shunt expiration warning relay |
| shuntTime | uint32 | time in seconds (1-999) | | time to shunt door after it opens |
| switchMonitor | uint32 | | | switch monitor input ID |
| RTE | uint32 | | | RTE input ID |
| unlockDoorOnRTE | bool | | | turn the strike on for RTE access |
| unlockTime | uint32 | time in seconds (1-999) | | time to unlock door before it opens |

As another example, the following Table 9 defines a File object. The file object supports file management to upload and download of files.

TABLE 9

| Field Name | Datatype | Possible Values | M | Details |
|---|---|---|---|---|
| filename | string | | | filename |
| fileType | string | "firmware", "readerFw" | | file type when firmware is uploaded |
| manifest | string | | | file manifest |

As another example, the following Table 10 defines a Group object. The group object allows grouping of multiple instances of similar objects (e.g., doors).

TABLE 10

| Field Name | Datatype | Possible Values | M | Details |
|---|---|---|---|---|
| method | string | "lock", "unlock", "momentaryUnlock", "secure" | | for doors, "lock", "unlock", "momentaryUnlock", "secure" |
| methodAction | string | "add", "delete" | | |
| methodActivation | date | | | |
| methodExpiration | date | | | |
| methodID | uint32 | | | |
| methodInterval | timeMs | | | |
| objectType | string | "door" | x | object type associated with the group |
| partialCount | string | "partialList", "includeAll" | x | include all objects or just a few |
| partialList | array | | | list of objects |

As another example, the following Table 11 defines a Heartbeat object. The Heartbeat object can only be set up on modification.

TABLE 11

| Field Name | Datatype | Possible Values | M | Details |
|---|---|---|---|---|
| interval | u32 | | | interval in seconds |

As another example, the following Table 12 defines a Holiday object. The Holiday object defines a variation in a time schedule.

TABLE 12

| Field Name | Datatype | Possible Values | M | Details |
|---|---|---|---|---|
| day | uint32 | 1-31 | | day of month of the holiday |
| endTime | time | | x | end time of holiday |
| holidayIndex | uint32 | 0-23 | x | index of the holiday |
| month | string | "january", "february", "march", "april", "may", "june", "july", "august", "september", "october", "november", "december" | | holiday month |
| pattern | string | "every", "onlyOnce" | | holiday recurrence pattern |
| recurrence | string | "once", "yearly", "monthly", "weekly" | | holiday recurrence |
| startTime | time | | x | starting time of holiday |
| weekDay | string | "sunday", "monday", "tuesday", "wednesday", | | day of week of the holiday |

TABLE 12-continued

| Field Name | Datatype | Possible Values | M | Details |
|---|---|---|---|---|
| whichDay | string | "thursday", "friday", "saturday" "first", "second", "third", "fourth", "last" | | ordinal day of the holiday |

As another example, the following Table 13 defines an Input object. The Input object defines a method performed at an input of a device.

TABLE 13

| Field Name | Datatype | Possible Values | M | Details |
|---|---|---|---|---|
| index | uint32 | 0-7 for EdgeG2 | | hardware index |
| method | string | "arm", "disarm" | | Method performed at input of the object |
| methodAction | string | "add", "delete" | | Add or delete the method |
| methodActivation | date | | | Activation date |
| methodExpiration | date | | | Expiration date |
| methodID | uint32 | | | Method identifier |
| parentDevice | uint32 | | | present if the reader is associated with a parent device (i.e. ACM) |
| resistorConfig | string | "1kDualNONC", "1kSingleSeriesNC", "1kSingleParallelNO", "5kDualNONC", "5kSingleParallelNO", "10KDualNONC", "10kSingleSeriesNC", "10kSingleParallelNO", "unsupervisedNC", "unsupervisedNO", "1k2kDoubleNC", "6k8/18kDoubleNC", "6k8/18kDoubleNO", "200/10kDoubleNC", "200/10kDoubleNO", "1kDoubleNC", "1kDoubleNO", "10kDoubleNC", "10kDoubleNO", "5kDoubleNC", "5kDoubleNO" | | Configuration of a resistor at input of device |
| specialPurpose | string | "tamper", "powerFailure", "batteryLow", "temperatureAlarm", "eMMCInput", "securityViolationAlarm", "rs485Port1Status", "rs485Port2Status" | | Special purpose inputs for testing device |

As another example, the following Table 14 defines an Output object. The Output object defines a method performed at an output of a device.

TABLE 14

| Field Name | Datatype | Possible Values | M | Details |
|---|---|---|---|---|
| index | uint32 | 0-3 for EdgeG2 | | hardware index |
| method | string | "activate", "deactive", "pulse" | | Method performed at the output of the device |
| methodAction | string | "add", "delete" | | Method performed at input of the object Add or delete the method |
| methodActivation | date | | | Activation date |
| methodExpiration | date | | | Expiration date |
| methodID | uint32 | | | Method identifier |
| methodInterval | timeMs | | | present if the reader is associated with a parent device (i.e. ACM) |
| parentDevice | uint32 | | | |

As another example, the following Table 15 defines a Personnel object. The Personnel object defines people based on a credential or clearance. The Personnel object includes two arrays "credentialList" and "clearanceList" of credential information and clearances respectively.

TABLE 15

| Field Name | Datatype | Possible Values | M | Details |
|---|---|---|---|---|
| accessLevel | uint32 | | | A defined access level of permitted users |
| activation | date | | | activation time for personnel entry |
| ADAPinExempt | bool | | | Indicates whether disability access is enabled |
| cardNumber | uint32 | | | card number |
| clearance | uint32 | | | clearance ID |
| disabled | bool | | | disabled cardholder |
| expiration | date | | | expiration time for personnel entry |
| lost | bool | | | lost card status of user |
| noticed | bool | | | noticed cardholder |
| pin | string | | | an allowed input sequence |

TABLE 15-continued

| Field Name | Datatype | Possible Values | M | Details |
| --- | --- | --- | --- | --- |
| start | date | | | expiring clearances start time |
| stolen | bool | | | stolen card status of user |
| stop | date | | | expiring clearances stop time |
| visitor | bool | | | visitor cardholder |

As another example, the following Table 16 defines a Reader object. The Reader object defines a card reader device. The Reader object includes an array "cardFormatList" of supported card formats.

TABLE 16

| Field Name | Datatype | Possible Values | M | Details |
| --- | --- | --- | --- | --- |
| accessLevel | uint32 | | | access level |
| address | uint32 | | | reader address |
| baud | uint32 | | | baud rate |
| protocolType | string | "osdp", "rm", "smart", "aperio", "wiegand" | | protocol type |
| cardFormat | uint32 | | | card format identifier |
| enablingReader | uint32 | | | reader that enables this reader after hours |
| enablingTimeSpec | uint32 | | | time spec during which after hour access is enforced |
| index | uint32 | 0-3 for EdgeG2 | | reader location |
| method | string | "enablePin", "disablePin", "changeLevel" | | Methods performed by reader device |
| methodAction | string | "add", "delete" | | Method performed at input of the object |
| methodActivation | date | | | Add or delete the method |
| methodExpiration | date | | | Activation date |
| methodID | uint32 | | | Expiration date |
| mode | string | "pin", "card" | | Input mode |
| osdpCustomKey | string | AES-128 key encoded as a Base64 string | | Current OSDP custom key |
| parentDevice | uint32 | | | present if the reader is associated with a parent device (i.e. ACM) |
| readerType | string | "osdp", "wiegand", "schlage", "aperio" | | reader type |

As another example, the following Table 17 defines a System State object. The System State can be modified to configure the LCD display state and the broadcasting of discovery packets. The get action is supported with no parameters to retrieve system state information.

TABLE 17

| Field Name | Datatype | Possible Values | M | Details |
| --- | --- | --- | --- | --- |
| Enabled | bool | | | Enable LCD |

As another example, the following Table 18 defines a Time Spec object. The Time Spec object supports an array of intervals "intervalList."

TABLE 18

| Field Name | Datatype | Possible Values | M | Details |
| --- | --- | --- | --- | --- |
| dayList | array | | | list of days |
| Day | string | "monday", "tuesday", "wednesday", "thursday", "friday", "saturday", "sunday", "holiday1" . . . "holiday24" | | Day of week or holiday name |
| startTime | time | | | starting time of interval |
| endTime | time | | | end time of interval |

As another example, the following Table 19 defines a Time Zone object. The Time Zone object defines a time zone or time adjustment.

TABLE 19

| Field Name | Datatype | Possible Values | M | Details |
| --- | --- | --- | --- | --- |
| timeZone | string | | x | time zone |
| time | time | | x | time |

As another example, the following Table 21 defines a Web object. The Web object defines a web credential.

TABLE 21

| Field Name | Datatype | Possible Values | M | Details |
| --- | --- | --- | --- | --- |
| password | string | | | password |
| username | string | | | username |

In an aspect, the device control component 120 and/or the command component 122 checks the parameters of a received command message 300 to ensure mandatory dependencies exist. Note that for those messages configuring objects with missing dependencies an object status 405 (Not Allowed) response is transmitted. Examples of these scenarios include the creation of a reader for which the card format has not been created or the reference to a door ID for which the door object has not been created.

As illustrated, the payload 318 includes 3 objects 162a, 162b, and 162c. Each object includes one or more parameters 320 having a value 322. The object 162a may be, for example, a reader object with parameters 320 for a card format and a time spec. Both of these parameters 320 may be optional and the value 322 may include an identifier of another object. The object 162b may be a card format object with parameters 320 for a facility code 340 and format 342. The object 162c may be a time spec object with parameters 320 for a startTime 350 and an endTime 352. Accordingly, the command message 300 may be used to configure a card reader 114 with information for reading cards during a particular time of day. In an aspect, the configuration for the card reader 114 may be stored at the panel 112, which controls the configuration of the card reader 114.

Figure 4:
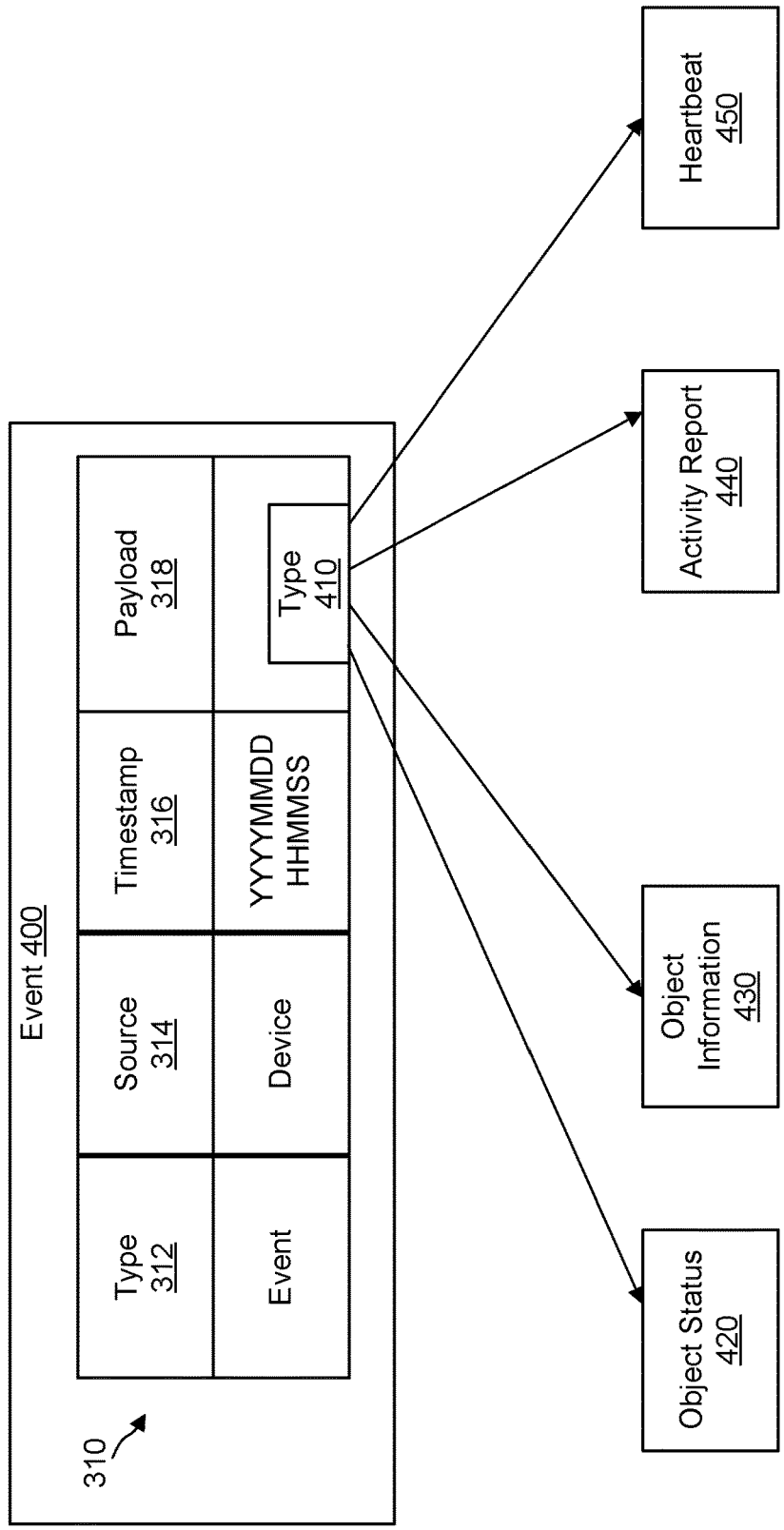
FIG. 4 is a diagram of an event message, according to some aspects.

FIG. 4 is a diagram of an event message 400, which may be an example message for transmitting an event 136. The event message 400, like the command message 300, includes fields 310 including a type field 312, a source field 314, a timestamp 316, and a payload 318. The type field 312 is a mandatory field that includes a string datatype that defines the type of message as an event. In the illustrated example, the type field 312 indicates an event message. The source field 314 indicates a source of the event message 400, which may be the device 110. The timestamp 316 indicates a time of the message, which may be expressed in various known time formats. In some implementations, a Year, Month, Day, Hour, Minute, Second format is used to allow easy human readability of the timestamp. The payload 318 includes a type field 410 defining a type of event and content specific to the type of event.

The object status event 420 is always sent in response to an action performed against an object. For actions add, modify and delete an object status event 420 is sent after the object is added, modified or deleted. For the get action an object status event 420 is sent to acknowledge the command message 300 and the actual object information is sent as a separate object information event 430. This enables support of IoT observation, where a single get command can produce multiple object information objects. Table 22 shows the fields of an object status event 420 including a mandatory ID of the object and status code.

TABLE 22

| Field Name | Datatype | Possible Values | M | Details |
|---|---|---|---|---|
| code | uint32 | standard IoT IETF RFC7252 response codes: 200 OK 201 Object Created 202 Object Deleted 204 Object Changed 405 Not allowed | x | Result code of last command on object |
| reason | string | | | Free-text reason provided by device |
| ID | uint32 | | x | object identifier |

The object information event 430 is sent in response to a get command. The object information event 430 carries object information. Sequential object information events 430 can be sent to support IoT observation. The object information event 430 includes an "objectList" array of objects that are defined by a field name, a datatype, one or more Possible Values, and a mandatory status as with objects in a command message 300. A mandatory ID and object name are included for each object. Note that a single object information message can include multiple objects.

All physical objects including "door", "reader", "input", "output", "clearance", "personnel", "timeSpec", "cardFormat" rely on object definitions that follow the same structures used for configuration as discussed above.

The "systemState" object information event is a special object sent in response to a get command. Table 23 shows the fields of the systemState object.

TABLE 23

| Field Name | Datatype | Possible Values | M | Details |
|---|---|---|---|---|
| bootTime | | | x | Time that system started |
| firmwareVersion | string | | x | firmware version |
| l2Address | string | | x | layer 2 address (i.e. MAC address under Ethernet) |
| memoryState | string | "sufficient", "low", "criticallyLow" | x | Level of available memory |
| totalRam | uint32 | | x | size in bytes |
| totalAvailableRam | uint32 | | x | size in bytes |
| totalProgramRam | uint32 | | x | size in bytes |
| totalAvailableProgramRam | uint32 | | x | size in bytes |
| totalDatabaseRam | uint32 | | x | size in bytes |
| totalAvailableDatabaseRam | uint32 | | x | size in bytes |
| superCapCharged | bool | | x | Whether capacity is charged |
| web | string | "yes", "no" | x | web interface object has been created |
| lcd | string | "enabled", "disabled" | | Whether panel display is enabled |
| broadcastMessages | string | "enabled", "disabled" | | Whether broadcast messages are enabled |

The activity report event 440 is sent in response to a change in a physical entity (e.g., card swiping, input state changes, etc.). The activity report event 440 includes an "objectList" array of objects. A mandatory ID, activity type, and timestamp are included for each object. The activity types may include a door, doorAccess, input, or output. Table 24 summarizes the content of an activity report event 440.

TABLE 24

| Field Name | Datatype | Possible Values | M | Details |
|---|---|---|---|---|
| ID | uint32 | | x | specifies a unique identifier |
| type | string | "door", "doorAccess", "input", "output" | x | specifies the activity type |
| timestamp | date | | x | timestamp of the activity |

A door activity type specifies changes of the door state. Table 25 shows parameters included in a door activity type activity report event 440.

TABLE 25

| Field Name | Datatype | Possible Values | M | Details |
|---|---|---|---|---|
| alarm | string | "normal", "forced", "held" | x | specifies the door alarm |
| state | string | "open", "close" | x | specifies the door state |

A door access activity type specifies changes to door access. Table 26 shows parameters included in a door access activity type activity report event 440.

TABLE 26

| Field Name | Datatype | Possible Values | M | Details |
|---|---|---|---|---|
| admitted | bool | | x | was the person admitted? |
| doorUsed | bool | | | was the door used? |
| duress | bool | | | card swipe indicated duress |
| noticed | bool | | | is personnel noticed? |
| personnelID | uint32 | | x | personnel ID accessing door |
| rejectCode | uint32 | 1 unknown card, 2 reject clearance, 3 bad facility code, 10 card not yet active, 13 misread | | if not admitted, this is the error code |
| visitor | bool | | | is personnel visitor? |

An input activity type specifies changes to an input (e.g., of a panel 112). Table 27 shows parameters included in an input activity type activity report event 440.

TABLE 27

| Field Name | Datatype | Possible Values | M | Details |
|---|---|---|---|---|
| state | string | "unInit", "secure", "active", "openLoop", "shortLoop", "fault", "ground" | x | hardware input state |

An output activity type specifies changes to an output (e.g., of a panel 112). Table 28 shows parameters included in an output activity type activity report event 440.

TABLE 28

| Field Name | Datatype | Possible Values | M | Details |
|---|---|---|---|---|
| active | bool | | x | is it active? |
| enabled | bool | | x | is it enabled? |

The heartbeat event 450 is used to maintain an application message layer session between the device 110 and the application 140. The heartbeat event 450 does not include any parameters. Both the device 110 and the application 140 may transmit heartbeat events 450 to indicate that the session is still active. In some implementations the device 110 and the application 140 are configured with a periodicity for the heartbeat event messages. For example, the periodicity may be 30 seconds. The device and the application 140 may also be configured with a delay time, which is longer than the periodicity 910, for example, 35 seconds. If a heartbeat event message is not received within the delay time after an expected time based on the periodicity, a device 110 or application 140 may refrain from sending additional messages until a heartbeat event 450 is received.

Figure 5:
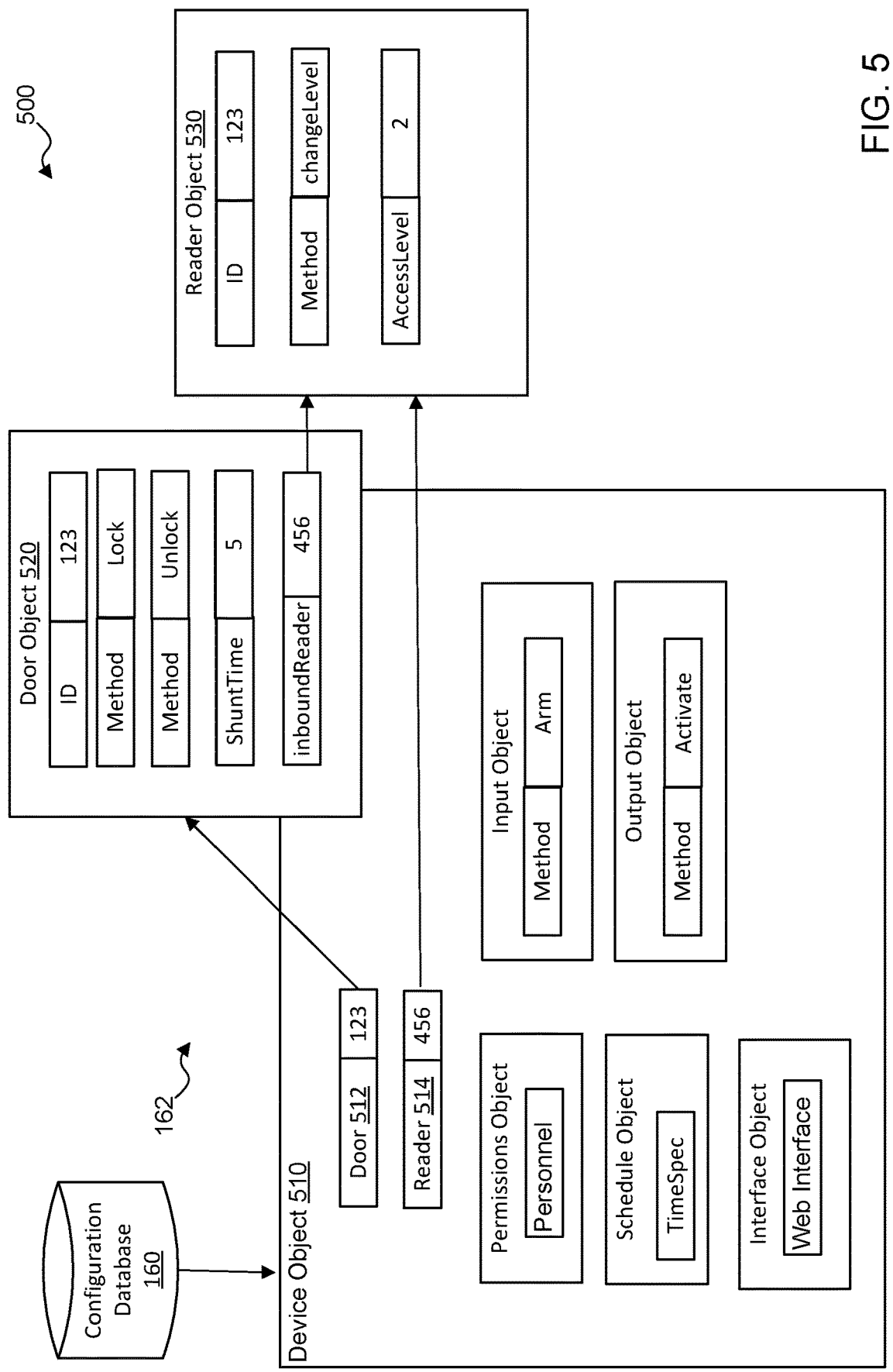
FIG. 5 is a diagram of relationships of objects in a configuration of a device, according to some aspects.

FIG. 5 is a diagram 500 of relationships of objects in a configuration of a device 110. For example, the configuration may be stored in the configuration database 160. In some implementations, the objects are encoded following standard JavaScript object notation (JSON) data structures. The objects 162 (FIG. 1) support string and numerical types as well as arrays. In some implementations, the open architecture makes no modifications or changes to the way in which data is stored with JSON. Any standard JSON encoder/decoder can be used to prepare messages for transmission. An object may refer to another object by including the ID of the object as a value in a corresponding parameter. For example, a door parameter may identify a door object by listing the ID of the door object as the value of the door parameter.

In the example shown in FIG. 5, the configuration dataset 160 may store a device object. The device object 510 may include any of the objects discussed above. In some implementations, any objects stored in the configuration database 160 of a device 110 may be considered part of the device object 510 for the device 110. For example, a command to get the configuration object of the device 110 may return all of the objects stored in the configuration database 160.

The device object 510 may include one or more parameters of a first object in the list of objects that include a parameter that references a second object defined in the command or in another message. For example, the device object 510 may include a door parameter 512 and a reader parameter 514. The door parameter 512 may include an ID of a door object 520 and the reader parameter 514 may include an ID of a reader object 530.

The door object 520 may define a configuration of a door. In some implementations, an object corresponding to a device such as the door object 520 may include one or more parameters for the object that include a method performed by the device, and the value associated with the parameter indicates which method to perform. For example, a method parameter may include a value of "lock" for a lock method or a value of "unlock" for an unlock method. In some implementations, the object corresponding to the device includes additional parameters defining parameters of the method. For example, the door object 520 may include a shuntTime parameter indicating a period of time (e.g., 5 seconds) that the door is shunted after opening. The door object 520 may also include an inboundReader object that references another device such as the reader object 530. As another example, the reader object 530 may include a method parameter with a value of changeLevel. The reader object may include an AccessLevel parameter that changes the configured value for the access level to the value of the AccessLevel parameter.

In another aspect, the one or more objects include an object corresponding to a configuration of permissions, schedules, or an interface of the device. For instance, a permissions object may correspond to a personnel object, after hour list object, or clearance object described above. A schedule object may refer to the time specification object or holiday object described above. An interface object may correspond to the web interface object described above.

In another aspect, the one or more objects include an input configuration or an output configuration that indicates a method to be performed at an input of the device or an output of the device. For example, an input object may include a method to arm the device 110 and an output object may include a method to activate a second device (e.g., door) connected to the device 110 (e.g., panel 112).

Figure 6:
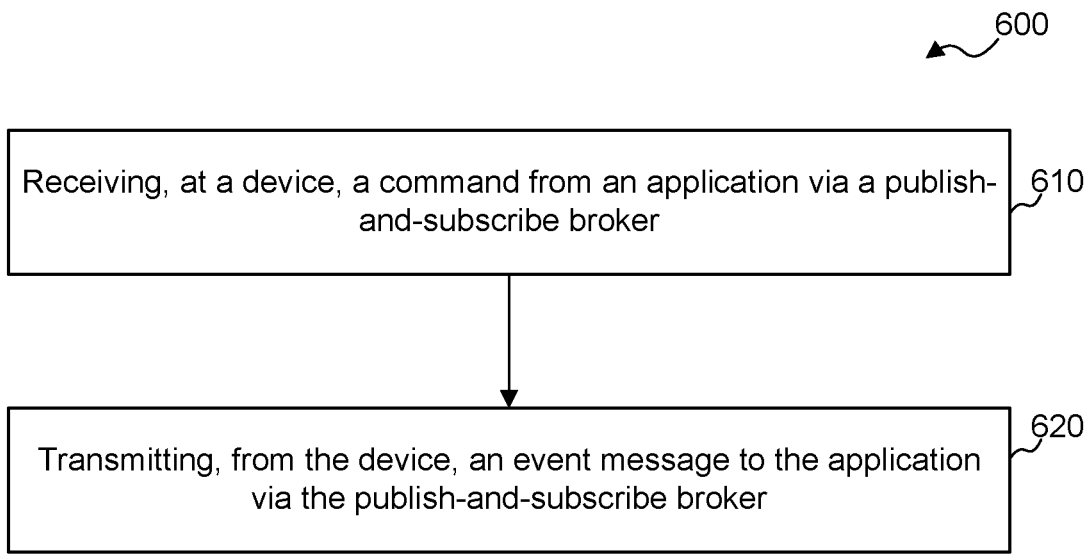
FIG. 6 is a flowchart of an example method of a device for configuration from an application.

FIG. 6 a flowchart of an example method 600 for receiving a configuration at a device 110. The device 110 may perform the method 600 such as via execution of the device control component 120 by processor(s) 202 and/or memory 204. For example, the memory 204 may store computer-executable code and the processor 202 may execute the computer-executable code to cause the device 110 to perform the method 600 when executed by the one or more processor(s) 202, individually or in combination. Further, the device 110 may be configured to perform the method 600 in communication with the application 140 and the publish-and-subscribe broker 132, as described herein.

At block 610, the method 600 includes receiving, at a device, a command from an application via an publish-and-subscribe broker. For example, in an aspect, device 110, processor 202, and/or memory 204 may receive a command message 300 from an application 140 via a publish-and-subscribe broker 132. The command includes: a type field 312 indicating the command, a source field 314 indicating the application, a timestamp 316, and a payload 318 including a list of objects, each object 162 including one or more parameters defined by a field name, a datatype, one or more possible values, and a mandatory status. Accordingly, the device 110, processor 202, and/or memory 204 executing the device control component 120 and/or the command component 122 may provide means for receiving, at a device, a command from an application via an publish-and-subscribe broker.

At block 620, the method 600 includes transmitting, from the device, an event message to the application via the publish-and-subscribe broker. For example, in an aspect, device 110, processor 202, and/or memory 204 may execute the device control component 120 and/or the event component 124 to transmit, from the device 110, an event message 400 to the application 140 via the publish-and-subscribe broker 132. The event message includes an object having a type field 312 identifying the event message, a source field 314 identifying the device 110, a timestamp 316, and a payload 318 including a type field 410 identifying a type of event. Accordingly, the device 110, processor 202, and/or memory 204 executing the device control component 120 and/or the configuration component 124 may provide means for transmitting, from the device, an event message to the application via the publish-and-subscribe broker.

Figure 7:
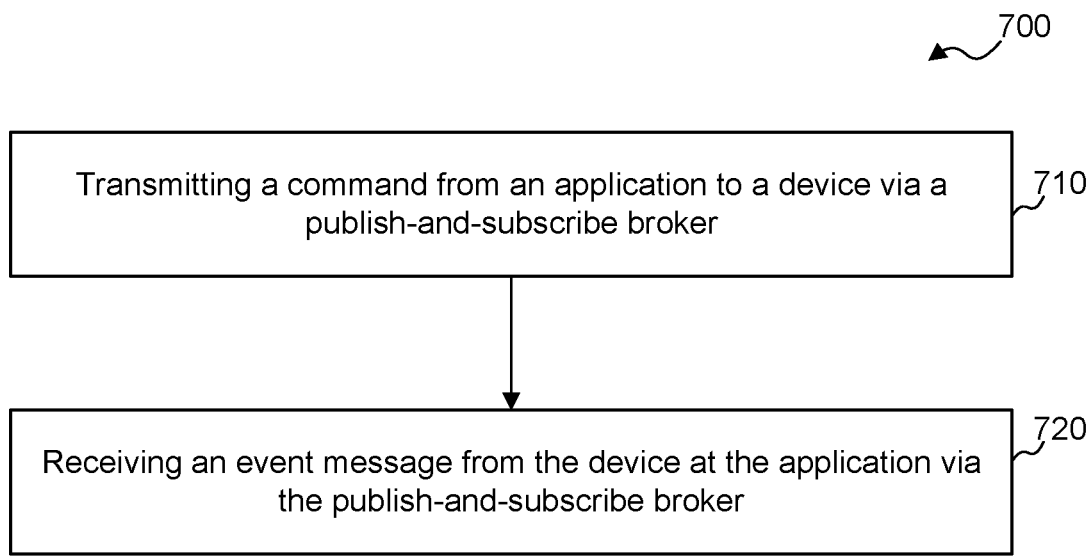
FIG. 7 is a flowchart of an example method of an application to control a device.

FIG. 7 is a flowchart of an example method 700 for configuring a device 110. The computing device 150 may perform the method 700 such as via execution of the application 140 by processor(s) 202 and/or memory 204. For example, the memory 204 may store computer-executable code and the processor 202 may execute the computer-executable code to cause the computing device 150 to perform the method 700 when executed by the one or more processor(s) 202, individually or in combination. Further, the application 140 may be configured to perform the method 700 in communication with the device 110 and the publish-and-subscribe broker 132, as described herein.

At block 710, the method 700 includes transmitting a command from an application to a device via a publish-and-subscribe broker, the command including. For example, in an aspect, application, processor 202, and/or memory 204 may execute the command component 142 to transmit the command message 300 from the application 140 to the device 110 via the publish-and-subscribe broker 132. The command message 300 includes a type field 312 indicating the command, a source field 314 indicating the application 140, a timestamp 316, and a payload 318 including a list of objects, each object 162 including one or more parameters 320 defined by a field name, a datatype, one or more possible values, and a mandatory status. Accordingly, the application 140, processor 202, and/or memory 204 executing the session component 142 may provide means for transmitting a command from an application to a device via a publish-and-subscribe broker.

At block 720, the method 700 includes receiving an event message from the device at the application via the publish-and-subscribe broker. For example, in an aspect, application 140, processor 202, and/or memory 204 may execute the event component 144 to receive an event message 400 from the device 110 at the application 140 via the publish-and-subscribe broker 132. The event message includes: a type field 312 identifying the event message, a source field 314 identifying the device, a timestamp 316, and a payload 318 including a type field 410 identifying a type of event. Accordingly, the application 140, processor 202, and/or memory 204 executing the configuration component 144 may provide means for receiving an event message from the device at the application via the publish-and-subscribe broker.

Some further example aspects are provided below.

Clause 1. A method comprising: receiving, at a device, a command from an application via a publish-and-subscribe broker, the command including: a type field indicating the command, a source field indicating the application, a timestamp, and a payload including a list of objects, each object including one or more parameters defined by a field name, a datatype, one or more possible values, and a mandatory status; and transmitting, from the device, an event message to the application via the publish-and-subscribe broker, the event message including: a type field identifying the event message, a source field identifying the device, a timestamp, and a payload including a type field identifying a type of event.

Clause 2. The method of clause 1, wherein the one or more parameters of a first object in the list of objects include a parameter that references a second object defined in the command or in another message.

Clause 3. The method of clause 1 or 2, wherein the list of objects includes an object corresponding to the device, the one or more parameters for the object include a method performed by the device, and the value associated with the parameter indicates which method to perform.

Clause 4. The method of clause 3, wherein the object corresponding to the device includes additional parameters defining parameters of the method.

Clause 5. The method of any of clauses 1-4, wherein the list of objects includes an object corresponding to a configuration of permissions, schedules, or an interface of the device.

Clause 6. The method of any of clauses 1-5, wherein list of objects includes an input configuration or an output configuration that indicates a method to be performed at an input of the device or an output of the device.

Clause 7. The method of any of clauses 1-6, wherein the type of event of the event message is an object status event including a code indicating whether an action corresponding to the command was performed on an object.

Clause 8. The method of any of clauses 1-7, wherein the type of event of the event message is an object information event including information for an object stored at the device.

Clause 9. The method of any of clauses 1-7, wherein the type of event of the event message is an activity report event identifying a change in the device and including an identifier of the device, a type of activity, a timestamp and one or more additional parameters specific to the type of activity.

Clause 10. The method of any of clauses 1-7, wherein the event message indicates a periodic heartbeat signal to maintain a session between the device and the application.

Clause 11. A configurable security device, comprising: one or more memories storing computer executable instructions; and one or more processors coupled to the one or more memories and, individually or in combination, configured to cause the device to: receive, at the device, a command from an application via a publish-and-subscribe broker, the command including: a type field indicating the command, a source field indicating the application, a timestamp, and a payload including a list of objects, each object including one or more parameters defined by a field name, a datatype, one or more possible values, and a mandatory status; and transmit, from the device, an event message to the application via the publish-and-subscribe broker, the event message including: a type field identifying the event message, a source field identifying the device, a timestamp, and a payload including a type field identifying a type of event.

Clause 12. The configurable security device of clause 11, wherein the one or more parameters of a first object in the list of objects include a parameter that references a second object defined in the command or in another message.

Clause 13. The configurable security device of clause 11 or 12, wherein the list of objects includes an object corresponding to the device, the one or more parameters for the object include a method performed by the device, and the value associated with the parameter indicates which method to perform.

Clause 14. The configurable security device of clause 13, wherein the object corresponding to the device includes additional parameters defining parameters of the method.

Clause 15. The configurable security device of any of clauses 11-14, wherein the list of objects includes include an object corresponding to a configuration of permissions, schedules, or an interface of the device.

Clause 16. The configurable security device of any of clauses 11-15, wherein the list of objects includes an input configuration or an output configuration that indicates a method to be performed at an input of the device or an output of the device.

Clause 17. The configurable security device of any of clauses 11-16, wherein the type of event of the event message is an object status event including a code indicating whether an action corresponding to the command was performed on an object.

Clause 18. The configurable security device any of clauses 11-16, wherein the type of event of the event message is an object information event including information for an object stored at the device.

Clause 19. The configurable security device of any of clauses 11-16, wherein the type of event of the event message is an activity report event identifying a change in the device and including an identifier of the device, a type of activity, a timestamp and one or more additional parameters specific to the type of activity.

Clause 20. The configurable security device of any of clauses 11-16, wherein the event message indicates a periodic heartbeat signal to maintain a session between the device and the application.

Clause 21. A method comprising: transmitting a command from an application to a device via a publish-and-subscribe broker, the command including: a type field indicating the command, a source field indicating the application, a timestamp, and a payload including a list of objects, each object including one or more parameters defined by a field name, a datatype, one or more possible values, and a mandatory status; and receiving an event message from the device at the application via the publish-and-subscribe broker, the event message including: a type field identifying the event message, a source field identifying the device, a timestamp, and a payload including a type field identifying a type of event.

Clause 22. The method of clause 21, wherein the one or more parameters of a first object in the list of objects include a parameter that references a second object defined in the command or in another message.

Clause 23. The method of clause 21 or 22, wherein the list of objects includes an object corresponding to the device, the one or more parameters for the object include a method performed by the device, and the value associated with the parameter indicates which method to perform.

Clause 24. The method of clause 23, wherein the object corresponding to the device includes additional parameters defining parameters of the method.

Clause 25. The method of any of clauses 21-24, wherein the list of objects includes an object corresponding to a configuration of permissions, schedules, or an interface of the device.

Clause 26. The method of any of clauses 21-25, wherein the list of objects includes an input configuration or an output configuration that indicates a method to be performed at an input of the device or an output of the device.

Clause 27. The method of any of clauses 21-26, wherein the type of event of the event message is an object status event including a code indicating whether an action corresponding to the command was performed on an object.

Clause 28. The method of any of clauses 21-26, wherein the type of event of the event message is an object information event including information for an object stored at the device.

Clause 29. The method of any of clauses 21-26, wherein the type of event of the event message is an activity report event identifying a change in the device and including an identifier of the device, a type of activity, a timestamp and one or more additional parameters specific to the type of activity.

Clause 30. The method of any of clauses 21-26, wherein the event message indicates a periodic heartbeat signal to maintain a session between the device and the application.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
   receiving, at a device, a command from an application via a publish-and-subscribe broker, the command including:
      a type field indicating the command, a source field indicating the application, a timestamp, and a payload including a list of objects, each object including one or more parameters defined by a field name, a datatype, one or more possible values, and a mandatory status; and
   transmitting, from the device, an event message to the application via the publish-and-subscribe broker, the event message including:
      a type field identifying the event message, a source field identifying the device, a timestamp, and a payload including a type field identifying a type of event.

2. The method of claim 1, wherein the one or more parameters of a first object in the list of objects include a parameter that references a second object defined in the command or in another message.

3. The method of claim 1, wherein the list of objects includes an object corresponding to the device, the one or more parameters for the object include a method performed by the device, and the value associated with the parameter indicates which method to perform.

4. The method of claim 3, wherein the object corresponding to the device includes additional parameters defining parameters of the method.

5. The method of claim 1, wherein the list of objects includes an object corresponding to a configuration of permissions, schedules, or an interface of the device.

6. The method of claim 1, wherein the list of objects includes an input configuration or an output configuration that indicates a method to be performed at an input of the device or an output of the device.

7. The method of claim 1, wherein the type of event of the event message is an object status event including a code indicating whether an action corresponding to the command was performed on an object.

8. The method of claim 1, wherein the type of event of the event message is an object information event including information for an object stored at the device.

9. The method of claim 1, wherein the type of event of the event message is an activity report event identifying a change in the device and including an identifier of the device, a type of activity, a timestamp and one or more additional parameters specific to the type of activity.

10. The method of claim 1, wherein the event message indicates a periodic heartbeat signal to maintain a session between the device and the application.

11. A configurable security device, comprising:
   one or more non-transitory memories storing computer executable instructions; and
   one or more processors coupled to the one or more memories and, individually or in combination, configured to cause the device to:
   receive, at the device, a command from an application via a publish-and-subscribe broker, the command including:
      a type field indicating the command, a source field indicating the application, a timestamp, and a payload including a list of objects, each object including one or more parameters defined by a field name, a datatype, one or more possible values, and a mandatory status; and
   transmit, from the device, an event message to the application via the publish-and-subscribe broker, the event message including:
      a type field identifying the event message, a source field identifying the device, a timestamp, and a payload including a type field identifying a type of event.

12. The configurable security device of claim 11, wherein the one or more parameters of a first object in the list of objects include a parameter that references a second object defined in the command or in another message.

13. The configurable security device of claim 11, wherein the list of objects includes an object corresponding to the device, the one or more parameters for the object include a method performed by the device, and the value associated with the parameter indicates which method to perform.

14. The configurable security device of claim 13, wherein the object corresponding to the device includes additional parameters defining parameters of the method.

15. The configurable security device of claim 11, wherein the list of objects includes an object corresponding to a configuration of permissions, schedules, or an interface of the device.

16. A method comprising:

transmitting a command from an application to a device via a publish-and-subscribe broker, the command including:

a type field indicating the command, a source field indicating the application, a timestamp, and a payload including a list of objects, each object including one or more parameters defined by a field name, a datatype, one or more possible values, and a mandatory status; and receiving an event message from the device at the application via the publish-and-subscribe broker, the event message including:

a type field identifying the event message, a source field identifying the device, a timestamp, and a payload including a type field identifying a type of event.

17. The method of claim 16, wherein the one or more parameters of a first object in the list of objects include a parameter that references a second object defined in the command or in another message.

18. The method of claim 16, wherein the list of objects includes an object corresponding to the device, the one or more parameters for the object include a method performed by the device, and the value associated with the parameter indicates which method to perform.

19. The method of claim 16, wherein the object corresponding to the device includes additional parameters defining parameters of the method.

20. The method of claim 16, wherein the list of objects includes an object corresponding to a configuration of permissions, schedules, or an interface of the device.

* * * * *